Patented Sept. 4, 1951

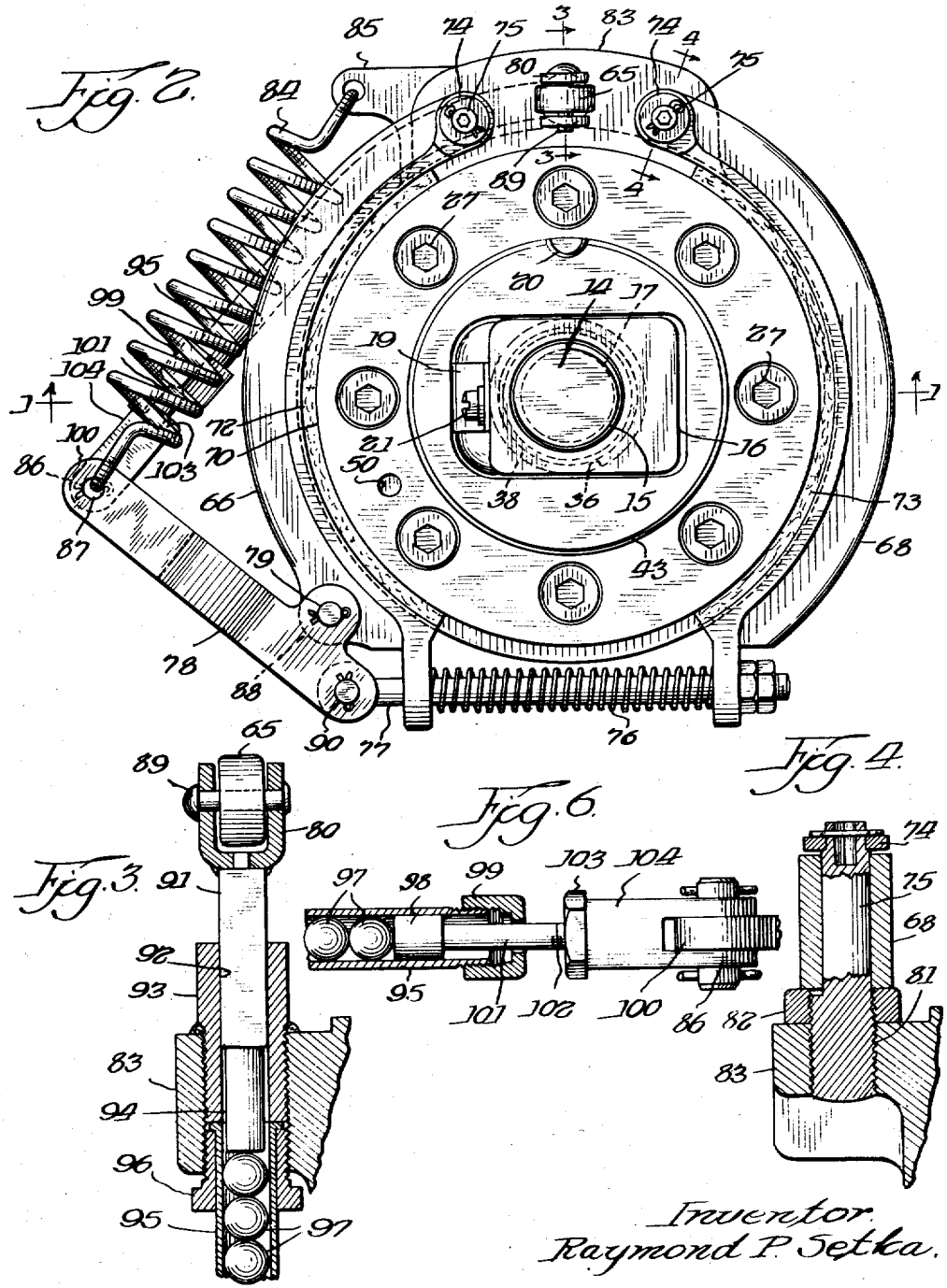

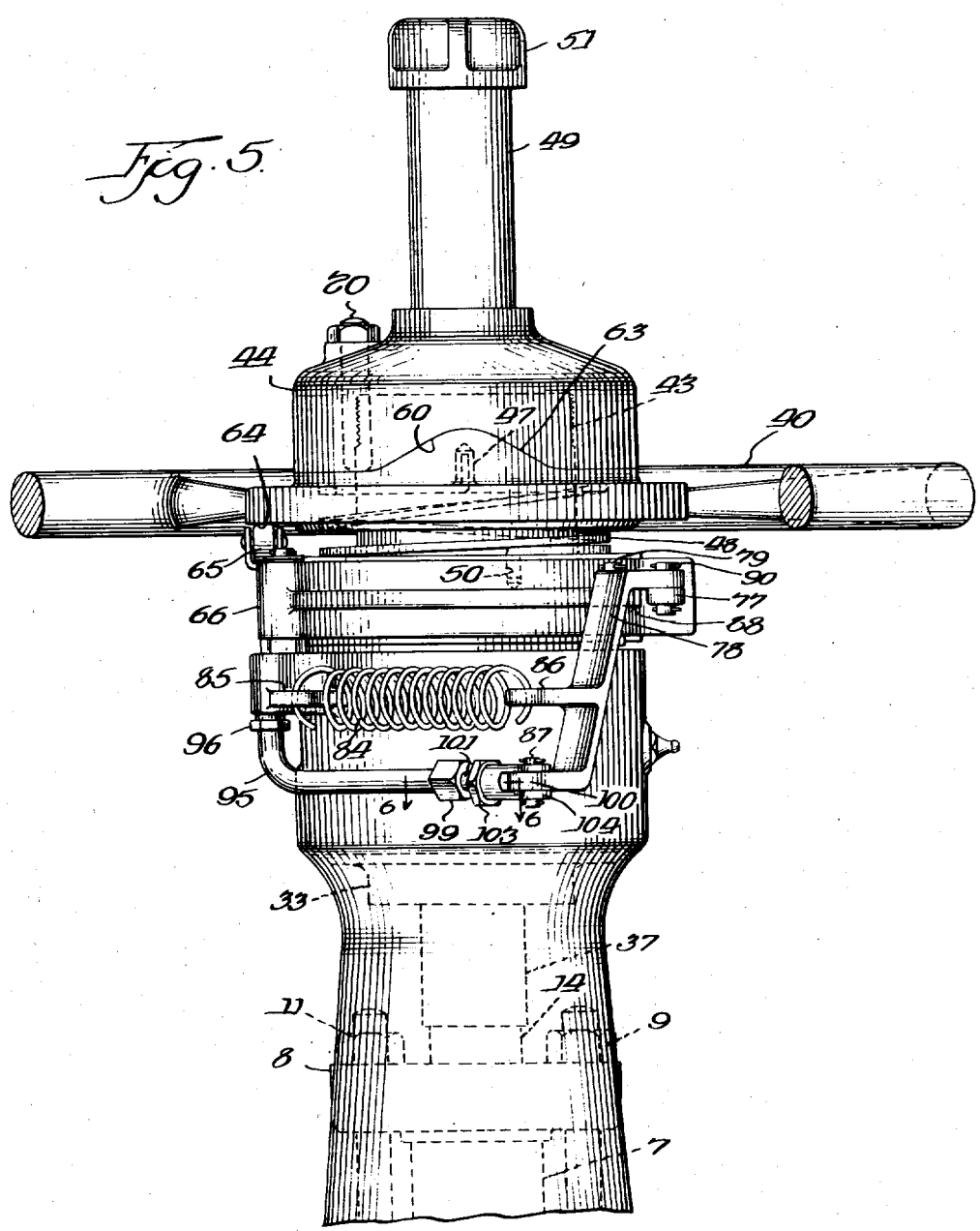

2,567,035

UNITED STATES PATENT OFFICE 2,567,035

VALVE ACTUATING MECHANISM OR THE LIKE

Raymond P. Setka, Chicago, Ill., assignor to Crane Co., Chicago, Ill., a corporation of Illinois Application December 16, 1949, Serial No. 133,339

18 Claims. (Cl. 192—7)

This invention relates to a valve actuating mechanism, and, more particularly, it is concerned with the provision of a novel automatic brake for valve constructions or the like employing a ball bearing threaded stem in a valve operator.

In order to obtain a better appreciation of the background of this invention, it should be understood at the outset that the mechanism of this invention is particularly adaptable to such valve actuating mechanisms in which a ball bearing threaded stem of the general type shown in U. S. Patent No. 1,831,080, granted November 10, 1931, among others, is employed. The ball bearing threaded stem journalling mechanism per se is old, and, therefore, no claim is made herein to such construction applied to a valve actuator. However, it is one of the principal purposes of a ball bearing threaded stem to facilitate easy operation in rotating the stem within the valve yoke or yoke sleeve, in order to raise or lower the valve disc in opening and closing operations respectively. Heretofore, one of the objections to the use of ball bearing threaded stem mechanisms has been the tendency for the valve when in the open position to drift toward closing, notwithstanding the usual braking or slowing-down effect of valve packing normally employed, and this is particularly true in such instances in which there has been vibration encountered on the pipe line or where the ordinary handwheel is employed. Obviously, such accidental closing (or opening) results in a significant danger to the line operator, especially in such instances where a manufacturing or chemical processing may be involved.

Thus it is one of the more important objects of this invention to provide a simple and effective means for holding or braking the movement of the valve stem and the closure member in a valve in any position between opening and closing and still allow for the full efficiency and benefits of the ball bearing threaded stem to be exercised.

Another important object is to provide for a braking construction of the character described in which the automatic brake will apply itself immediately upon releasing the handwheel or the gears used for valve actuation.

Another object is to provide for a valve braking mechanism in which the opening or closing of the valve is controlled only by the handwheel or relatively simple gearing, and separate and complicated levers in cooperation are not required.

Another important object is to provide for a brake mechanism for use with ball bearing threaded stem operators, in which a conventional handwheel or gear may be used, and yet the brake will be effective whether the handwheel is operated in either direction, that is, clockwise or counterclockwise, depending upon whether the valve is being closed or opened.

A further object is to provide for a construction in which the ball bearing threaded stem operator is applied to a valve easily and economically. It is rendered practical with a simple holding or braking mechanism, whereby such hold is automatically released by the braking means by a simple single motion, either by the rotation of the handwheel or the gear that may be employed.

It should, of course, be further understood that in connection with ball bearing threaded stems when applied to a valve, such threaded stems have been so efficient that they are not self-locking, and therefore, the seating torque as applied on the handwheel to seat the valve disc or closure member would be ineffective when the handwheel is released, since the stem would rise in the yoke sleeve or nut. On globe valves, for example, it was impossible heretofore to throttle the valve with the disc, and in many cases, where high internal pressures were employed, when in the pipe line the latter pressure acting on the stem area would cause the valve to open at a rapid rate and, therefore, endanger the operator if he were to attempt handwheel manipulation at relatively high speeds.

A still further object of the invention is to provide a means for applying a brake which prevents rotation of the yoke sleeve or the stem, as the case may be, except when the valve is to be operated, and only then is the braking mechanism forming the subject matter of this invention released and the full efficiency of the ball bearing thread made available for opening or closing the valve. Thus, operation in either direction is not hampered by any drag, because the brake releases completely.

Other objects and advantages will become more readily apparent upon proceeding with the specification read in light of the accompanying drawings, in which Fig. 1 is a fragmentary sectional assembly view of a preferred application of my invention, taken on the line 1—1 of Fig. 2.

Fig. 2 is a partial plan exterior view with gear or handwheel and cover removed.

Fig. 3 is a fragmentary sectional view taken on the line 3—3 of Fig. 2.

Fig. 4 is a fragmentary sectional view taken on the line 4—4 of Fig. 2.

Fig. 5 is a fragmentary exterior front view of a modified form of the structure of a handwheel in place of a gear.

Fig. 6 is a fragmentary sectional view taken on the line 6—6 of Fig. 5.

Similar reference numerals refer to similar parts throughout the several views.

Figure 1:
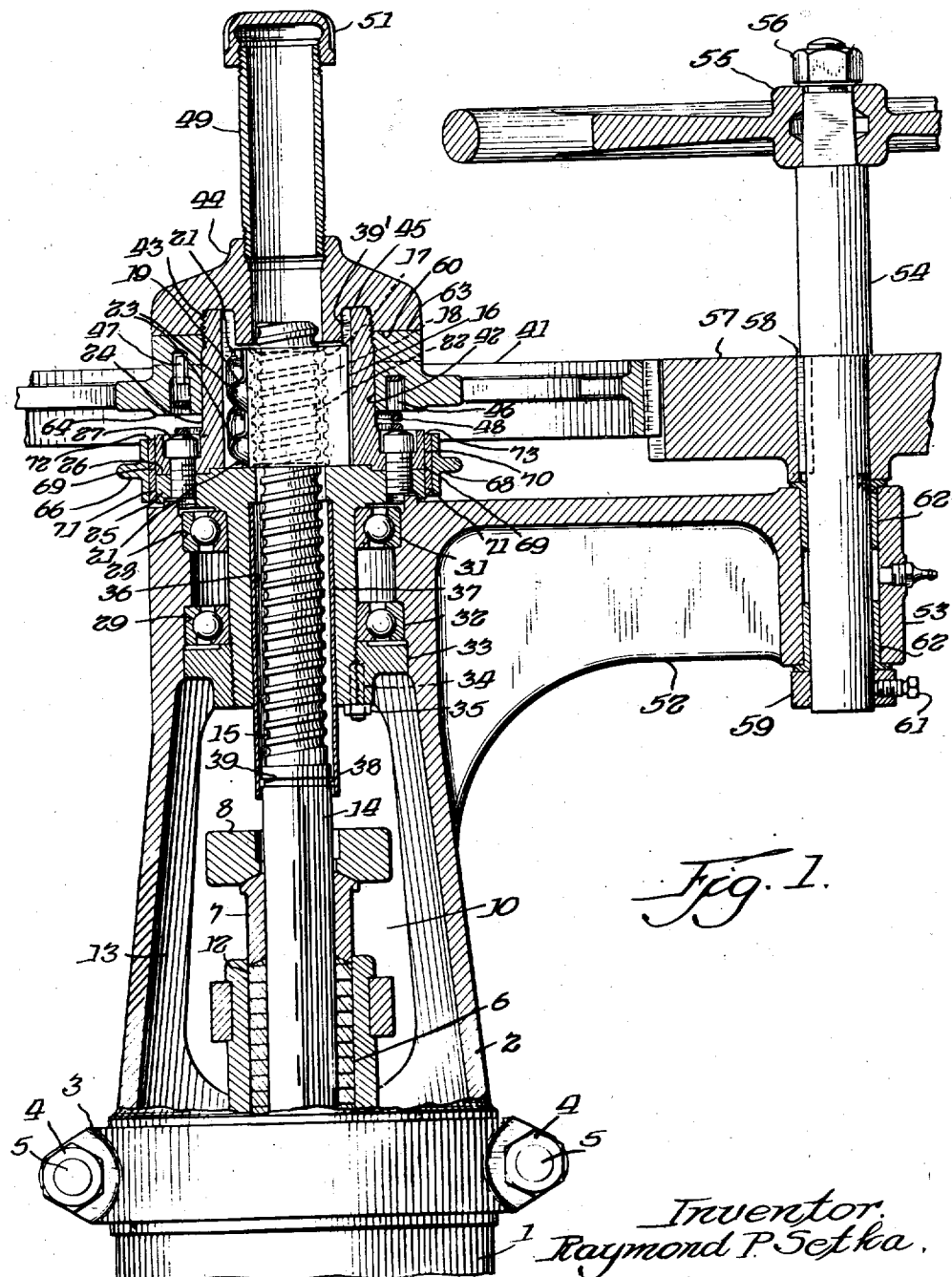

Referring now to Fig. 1, there is indicated in fragmentary section the upper portion of a pressure seal valve 1 (not shown) of the type shown on page 214 of Crane Co.'s No. 49 catalog. The valve yoke 2 is connected in the usual manner by means of an annular split clamp or collar 3 encompassing respective shoulders (not shown) on the body and yoke and which is held in tightly engaged relation thereto by means of the usual nuts 4 and the studs 5. The valve yoke 2 is provided with the conventional stuffing box 6, the gland 7, and the gland flange 8. As shown more clearly in the dotted lines in Fig. 5, the gland flange 8 is held in shouldered relation to the stuffing box by means of the gland studs 9 and the nuts 11 to thereby compress the packing 12 in the usual manner, with such access being made through the opening 10. The yoke 2 is made hollow, as at 13, to permit substantially enclosing the packing and stuffing box, the gland flange shouldering as indicated. In addition, the yoke serves as a supporting member for the novel actuating mechanism superposed as hereinafter described.

Instead of the conventional stem having the threads illustrated, as shown on the catalog page above referred to, in the instant construction a novel form of stem is used, designated 14, the stem being of the rising stem type. However, it should be appreciated that the invention is not necessarily limited to a rising stem type of valve. Continuing with the description, the stem 14 extends upwardly beyond the stuffing box with a threaded portion 15, as indicated, the said threaded portion at its upper end where the valve is in the seated or closed position engaging the ball bearing nut 16, the threads of the stem and the nut 16 at the spiral passage 17 being filled with the spirally extending rows of closely arranged balls 18 having the ball guide 19 threadedly attached to the nut at top and bottom, as at 21. Following the teachings of the aforementioned patent, it will be noted that substantially the entire axial load will be borne by the balls 18 with the shear stress applied across their greatest diameters. With such relative movement between the parts, the balls will tend to rotate and travel along the grooves 22, so that they will continue past different portions of their faces to the lines of transverse pressure. The return passages 23 of the ball guide 19 between the ends of the nut 16 enable the balls to travel in either direction, depending upon the rotation of the nut 16 which is relatively non-rotatably positioned within the annular extension member 24. It will be further noted that the latter member is non-rotatably mounted upon the yoke sleeve 25 and shouldered against an upper surface, as at 26, by means of the machine screws 27. The latter construction is preferable, but could be made as an integral unit if desired.

Below the shouldered upper portion of the yoke sleeve 25 and fitted within the annular recess 28 of the yoke 2, both at 28 and 29, respectively, the upper and lower roller ball bearings 31 and 32, respectively, are employed and are held in fixed position relative to the yoke sleeve by means of the snugly fitted threaded nut 33 locked to the yoke sleeve and employing the threaded stud 34 and the locknut 35.

It is preferable as a protective measure, although not absolutely necessary, to provide the interior of the yoke sleeve, as at 36, with a projecting sleeve 37 preferably sweated to the annular surface 36 and having at its lower end portion the wiping contact with the annular packing 38, placed as indicated on the stem 14 in a groove, as at 39, whereby the threads 15 of the stem are thus retained within a dust-proof chamber, as indicated. Obviously, the particular manner of providing for such dust-proof arrangement is not significant, and it may vary substantially from that illustrated and described.

As previously described, the threaded ball bearing nut 16 is non-rotatably received within the recessed portion 39' of the annular member 24, and the gear 41 is mounted for predetermined rotation upon the annular surface 42 of the member 24, as indicated. At its upper end, the member 24 is threaded, as at 43, to receive the combined cap and cam 44, the latter member being threaded to shoulder against the end surface 45 of the annular member 24. The gear 41 is preferably provided with an annular groove 46 to receive the end portion of a coil spring and also an upwardly extending locking end 47 of the spring 48, having its opposite and lower end bearing against the flange surface of the member 24, as illustrated, and for reasons hereinafter described at length. The combined cap and cam member 44 is provided with an extension tube 49, threadedly attached as indicated to the cap 44 and provided with an enclosure 51 to receive and to permit the axial travel of the stem while maintaining the latter in a dust-proof chamber. The cap and cam member 44 is held in locked relation to the threads 43 by means of the stud and nut 20 (Fig. 5). For cooperation with the gear 41, the yoke 2 is provided with the handwheel 55 and the wheelnut 56. Also non-rotatably mounted upon the shaft 54 is the pinion gear 57 preferably splined to the shaft 54 by means of the key 58, the shaft 54 being rotatably mounted and held against axial movement by means of the collar and set screw 59 and 61 respectively. The usual upper and lower journalling bearings 62 for the shaft may be provided as indicated.

A significant element of this contribution lies in the fact that the upper surface of the gear 41, as at 63, is constituted of oppositely disposed cam surfaces, the general shape of which is shown more clearly in Fig. 5, and which, as also indicated, are arranged to bear against the cam surfaces 60 of the cap 44.

The cam surfaces 63 allow for relative rotation of the gear 41 acting torsionally against the coil spring 48. Thus, as either the gear 41 (Fig. 1) or the handwheel 40 (Fig. 5) is rotated, the surface 64 will be caused to rotate slightly and bear against the roller 65. This rotation will cause a downward movement due to cam surfaces 60 and 63 which will further compress spring 48 and cause roller 65 to move downward, thereby actuating the brake release mechanism and cause the pivotal movement of brake shoes 66 and 68 for reasons hereinafter explained at length. The brake shoes bear respectively against the peripheral surfaces 69 and 71 of the annular member and the yoke sleeve respectively, having substantially the same diameter as shown, and employing in both cases the brake bands 72 and 73 on the respective shoes 66 and 68.

As to the manner in which the gear 41 or the handwheel 40 actuates the stem 14 in addition to the brake release action of said gears or handwheel, it should be understood that the torsional and axial deformation of the spring 48 resulting from the brake release rotations of said gear or handwheel will cause the cap 44 and the annular extension or sleeve member 24 with the nut 16 to follow the previous rotation of the gear and handwheel thereby to actuate the said stem before the brake reengages.

As shown more clearly in Figs. 2 and 5, the brake shoes 66 and 68 are pivotally mounted, as at 74 and 75 respectively, and are held in spaced-apart relation by means of the coil spring 76 mounted upon the eye-bolt 77, the brake shoe being connected to the inclined actuating lever 78 by means of the pivotal pin 79.

As shown in Fig. 4, each of the pivotal mounting pins 75 for the brake shoes 66 and 68 is eccentrically formed, so that by mere rotation of the pin 75 upon the threads 81, and then suitably tightening the locknut 82, the pin 75 may thereby be very nicely adjusted for position to permit the desired degree of play in the brake shoe, or in the clearance between the brake shoe and the drum or bearing surfaces 70 and 71 on the annular member 24, as shown more clearly in Fig. 1. The tapping of the adjustable pin 75 is within the flange 83 which is preferably, but not necessarily integral with the upper portion of the yoke 2. The respective brake shoes are maintained normally in gripping relation on or in engagement with the peripheral surfaces 69 and 71 when the cam surfaces 60 and 63 of the cap and the gear are in fully abutted position, as in Fig. 5. As shown more clearly in Fig. 2, the coil spring 84 at one end is attached to the fixed lug 85 of the yoke 2 and at the other end is attached to the pivotal lever 78 by means of the lug 86, which, as shown more clearly in Fig. 5, is connected to the lower end portion of the inclined lever 78, the latter lever being pivotally attached to the bifurcated connector 104 by the pin 87. At its upper end, the lever is mounted on the lug 88 by means of the pin 79. It will be noted that in connection with the fixed lug 83, the roller 65, as shown more clearly in Fig. 3, is mounted upon the pin 89 and will bear against the undersurface 64 of the handwheel 40 or the gear 41, as shown more clearly in Fig. 5. Slight rotation of the gear or handwheel will cause the surface 63 to be moved relatively transversely to and thereby climb upon the cam surface 60 of the cap 44 and thereby cause the handwheel 40 or the gear 41, as the case may be, to be moved axially downwardly toward the valve proper. The latter movement thereby compresses the spring 48, the immediate effect of which is to cause the roller supporting shaft 91 (see Fig. 3) which is non-rotatable and of polygonal cross-section to be moved axially downwardly within the inner surface 92 of the bushing 93. The plunger member 94 is thus caused to move similarly inward or downward as it is received within the tubing 95 and is held in snug relation to the yoke flange 83 by means of the threaded locknut 96. As indicated, the lower end of the plunger presses against the snugly mounted balls 97 which, as indicated, are positioned in close and contacting relation within the tubing 95. Thus, as the surface 63 moves against the cam surface 60, the roller 65 continues to rotate on its shaft 89, moving the plunger 94 further inwardly to force the balls 97 axially along the inner wall of the tubing 95, thereby to press against the oppositely positioned plunger member 98 at the opposite end of the tubing 95 (see Fig. 6), the latter mentioned plunger being contained within the threaded end of the tubing by means of the threaded nut 99. The plunger 98 is provided with the shaft extension 101 which is connected threadedly, as at 102, by means of the bifurcated connector 104 to the inclined lever 78 by means of the pins 87 as previously described. Thus, it will be apparent that a positive means has been provided whereby rotation of the handwheel 40 or the gear 41 will cause the cam surfaces 60 and 63 to slide one upon the other, thus causing the handwheel or gear to move downwardly. The latter actuating movement causes the roller 65 to be correspondingly depressed and thereby moving the supporting shaft and plunger with its bifurcated end 80 to be moved downwardly against the plurality of ball bearings 97. The lever 101 extending from the plunger 98 thus moves forward to pivotally actuate the lever 78 (see Fig. 2), the latter in turn being pivotally mounted, as at 79, causing a similar pivotal lever movement around the pin, as at 90, moving the bolt-lever 77 forward (to the right). This movement of the member 77 releases the brake shoes 66 and 68 from their peripheral contact with the upper and lower peripheral surfaces 70 and 71 of the yoke sleeve 25. Thus, the yoke sleeve is free immediately to rotate upon actuation of the gear or handwheel and thereby permit easy brake-released operation.

It will be apparent also that immediately upon cessation of rotation of the gear or handwheel, the spring 48 will cause the latter members to be moved upwardly and thereby release the load upon the roller 65 and the plunger 94. The coiled spring 84 aids in drawing the inclined lever 78 pivotally mounted at 79 (Fig. 2) to pull the brake shoe linings 72 and 73 together to bear against peripheral surfaces 70 and 71 and against the stretched coiled spring 76. Thus, the actuator mechanism is promptly locked, and any tendency of the stem to slide rotatably on the ball bearings 18 will be inhibited quickly whether in an opening or closing direction insofar as the valve operation is concerned. This is a benefit heretofore not enjoyed in a ball bearing stem operated valve.

It will, of course, also become apparent that the numerous details of construction may be varied throughout a wide range without departing from the principles disclosed herein.

I claim:

1. In a brake mechanism for a valve or the like, a stem, rotating means for actuating the said stem, the said rotating means including a yoke sleeve having an annular surface, brake shoes for engaging the said annular surface, the said stem rotating means including a cam mechanism cooperating therewith whereby the said rotating means is caused to move axially, lever means for effecting movement of the said brake shoes, ball and conduit means for moving a portion of the said brake shoes immediately upon rotation of the said stem rotating means.

2. In a brake mechanism for a valve or the like, a stem for the valve, rotating means for actuating the stem in an axial direction, the said rotating means including a yoke sleeve having an annular surface, brake shoe means for engaging the said annular surface, the said stem rotating means including a cam mechanism with annularly inclined surfaces cooperating with an upper surface of said yoke sleeve whereby the stem rotating means is caused to move axially downward, lever means engaging the said brake means, ball and conduit means for releasing the said brake shoe means immediately upon rotation of the said stem rotating means.

3. In an automatic brake for a ball bearing thread operator, the combination including a handwheel, a stem connected to the handwheel, a cam mechanism for holding the said handwheel in predetermined position, a yoke sleeve upon which the handwheel is mounted, brake means normally engaging the yoke sleeve to inhibit its free rotation, the said yoke sleeve being rotatable within limits prescribed by inclined surfaces of the said mechanism, the said handwheel rotating the said stem through the inclined surfaces of the cam mechanism, a cover connected to the said yoke sleeve, a roller means bearing against an undersurface of the said handwheel, the said roller means being vertically movable in response to the inclined surfaces of the cam when the handwheel is rotated, ball means connected with the said roller means, conduit means cooperating with the said cable whereby the normal holding effect of the brake means is released upon initial rotation of the said handwheel.

4. In an automatic brake for a ball bearing thread operator, the combination including a handwheel, a stem movable by the said handwheel, a cam mechanism for holding the said handwheel in predetermined position, a yoke sleeve to receive the said handwheel, the said yoke sleeve being relatively rotatable to the said handwheel within limits prescribed by oppositely disposed surfaces of the cam mechanism, the said handwheel effecting rotation of the said yoke sleeve through the said oppositely disposed surfaces of the cam, a cover member cooperating with the said yoke sleeve and carrying one set of surfaces engaging the cam, a roller bearing cooperating with the said handwheel, a brake mechanism for the yoke sleeve, the said roller being vertically movable upon occurrence of relative movement between the inclined surfaces of the cam upon rotation of said yoke sleeve, ball means for the roller, the latter roller member having a conduit connected to the said ball means, rigid means cooperating with the said ball means whereby the normal holding effect of the brake mechanism is released upon initial movement of the said roller and relative movement of the surfaces of the said cam mechanism and cover member.

5. In an automatic brake for a ball bearing thread operator for valves or the like, the combination including a handwheel, a cam mechanism with inclined surfaces for holding the said handwheel in a predetermined position, a rotatable yoke sleeve upon which the handwheel is mounted, brake shoes normally engaging the said yoke sleeve, the said yoke sleeve being rotatable only within limits prescribed by relative movement between inclined surfaces of the said cam mechanism, a cover forming a portion of the said cam mechanism, a roller vertically movable upon relative rotation occurring between the yoke sleeve and said cover, ball means for the said roller, the latter roller member being connected to the said ball means, conduit means cooperating with the said cable means whereby the normal engagement of the brake shoes with the yoke sleeve is released upon initial rotation of the said handwheel, resilient means for maintaining the said brake shoes in engaged relation to the said yoke sleeve.

6. In an automatic brake for a ball bearing thread operator for valves, the combination including a handwheel, a cam mechanism with inclined surfaces for holding the said handwheel in a centered position, a yoke sleeve to receive the said handwheel, the said yoke sleeve being rotatable to said handwheel within limits prescribed by the cam mechanism, a cover for the handwheel having cam surfaces cooperating with the inclined surfaces of the cam, brake means for the said yoke sleeve, roller means bearing against an undersurface of the said handwheel, the said roller means being vertically movable in response to relative movement between the cam surfaces of the said cam and cover, ball means for the roller, conduit means cooperating with the said ball means and the said brake means whereby the normal holding effect of the brake means is released upon initial rotation of the said handwheel, means for maintaining the brake mechanism in engaged position relative to the said yoke sleeve, means cooperating with the ball means to actuate the said brake means upon said initial rotation of the said handwheel.

7. In an automatic brake for a ball bearing thread operator, the combination including a handwheel, cam means for holding the said handwheel in a predetermined position, a yoke sleeve for the said handwheel cooperating with the said cam means, the rotation of the said handwheel driving through the inclined surfaces of the cam means, a cover fixed to the said yoke sleeve, a roller member bearing against an undersurface of the said handwheel, the said roller member being vertically movable as the handwheel rides on the inclined surfaces of the cam as the handwheel is rotated, ball means connected to the said roller member, a brake mechanism engaging the said yoke sleeve and actuated by the said ball means, conduit means movable by the said roller member and cooperating with the said ball means whereby the normal holding effect of the brake mechanism is released upon initial rotation of the said handwheel, means for normally maintaining the said brake mechanism in engaged position relative to the said yoke sleeve.

8. In a brake mechanism for a valve having a ball bearing mounted threaded stem, means for rotating the said stem including a yoke sleeve having annular surfaces, pivotally mounted brake means for engaging the said annular surfaces of the yoke sleeve, the said stem rotating means including a cam mechanism cooperating therewith whereby the said stem rotating means is caused to move axially, lever means actuated by said latter means engaging the said brake means, a combined ball and conduit means for moving the pivotally mounted portion of the said brake means upon initial rotation of the said stem rotating means, a portion of the said cam mechanism being rotatable and having oppositely disposed surfaces to effect said axial movement of the stem rotating means.

9. In an automatic brake for a ball bearing threaded stem operator, the combination including a stem and rotational means for actuation thereof, a brake mechanism for the rotational means, cam means for holding the said rotational means in predetermined position, the said rotational means driving through inclined surfaces of the cam, the cam means including a cover attached to the rotational means, a roller member bearing against an undersurface portion of the said rotational means, the said roller member being movable in a vertical plane as the rotational means moves on the inclined surfaces of the cam as the latter is actuated, combined ball and conduit means cooperating with the said roller member, the said roller being connected to the said conduit means, brake release means cooperating with the said conduit means whereby the gripping by the said brake mechanism by the said rotational means is released upon initial actuation of the said rotational means.

10. In a brake mechanism for a valve having a threaded stem, means for rotating the stem including a yoke sleeve having an annular surface, brake means for engaging the said annular surface, the said stem rotating means including a cam mechanism including a cover for the upper end of the said stem and having complementary cam surfaces cooperating therewith whereby the stem rotating means is initially caused to move axially, lever means for engaging the said brake means moved by the said axial movement of the stem rotating means, second lever means for moving a portion of the said brake means immediately upon rotation of the said stem rotating means.

11. In an automatic brake for a ball bearing threaded stem operator, the combination including a rotating means therefor, a cam mechanism with inclined surfaces for effecting axial movement of at least a portion of the rotating means, said rotating means including a yoke sleeve rotatable within limits prescribed by the said cam mechanism, brake means for the said yoke sleeve, the rotation of the said means occurring through the inclined surfaces of the cam, a cover locked to the yoke sleeve having cam surfaces, a roller vertically movable as the inclined surfaces of the cam mechanism are separated when the rotating means is actuated, combined ball and conduit means for the roller, the latter roller member being connected to the said ball and conduit means, lever means movable by the said roller through the said ball and conduit whereby the normal holding effect of the said brake means upon said yoke sleeve is released upon initial actuation of the said rotating means, resilient means for maintaining the brake mechanism in engaged position relative to the said yoke sleeve.

12. In a brake mechanism for a valve actuating means having a threaded axially movable stem, rotatable means for moving the stem including a yoke sleeve having an annular surface, brake means for engaging the said annular surface, the said stem rotating means including a cam mechanism cooperating therewith whereby the stem rotating means is caused to move axially downward, a roller annularly movable in a plurality of planes by the said stem rotating means, lever means for engaging the said brake means actuated by the said roller, second lever means actuated by said first-named lever means for moving a portion of the said brake means upon rotation of the said stem rotating means, the actuation of said cam mechanism effecting the said movement of the roller in a plurality of planes to cause the disengagement of the said brake means.

13. In automatic braking means for a ball bearing threaded stem valve operator, the combination including a brake mechanism, a rotatable actuating member supporting the brake mechanism, a cam mechanism for releasing the said brake mechanism upon actuation of the latter member, a cover attached to the actuating member cooperating with the said cam mechanism, a roller vertically movable in response to relative movement of the cam mechanism and said cover on the inclined surfaces therebetween, combined ball and conduit means for the roller, the said roller being connected to the said ball and conduit means, lever means cooperating with the said ball and conduit means whereby the normal holding effect of the brake means is released upon initial rotation of the said actuating member, resilient means for maintaining the brake mechanism in engaged position relative to the rotatable actuating member.

14. In an automatic brake mechanism for a ball bearing stem thread operator for valves or the like, the combination including an actuator and a stem, a brake for the said actuator, a cam mechanism for holding the said actuator in predetermined position, a yoke sleeve upon which the said actuator is mounted, the said yoke sleeve being relatively rotatable within limits prescribed by the cam mechanism, a cover for the stem attached to the yoke sleeve, a roller bearing against a substantially unyielding surface of the said actuator, the said roller being vertically movable upon rotation of the said actuator on the inclined surfaces of the cam mechanism, combined ball and conduit means communicating with the said roller, an end portion of the said ball and conduit means being connected with the said brake whereby the normal holding of the yoke sleeve by the brake in cooperation with the said cam mechanism is released upon initial rotation of the said actuator.

15. In a brake mechanism for a valve having a threaded axially movable stem, means for effecting axial movement of the stem, the said actuating means including a yoke sleeve having annular surfaces, pivotally movable brake means for engaging the said annular surfaces, the said stem actuating means including a roller and a cam mechanism comprising a pair of members in superposed relation with oppositely disposed cam surfaces, the stem actuating means being connected to one of said superposed members whereby the stem actuating means causes the said roller to move axially, lever means connected to said roller and engaging the said brake means, combined ball and conduit means for releasing the said brake means upon rotation of the said stem actuating means.

16. In a brake mechanism for a valve or the like having a rotating threaded stem, means for rotating the stem, the said rotating means including a sleeve member having annular surfaces, brake means for engaging the annular surfaces of said sleeve member, the said stem rotating means cooperating with shiftable portions of said brake means, the said brake means including a conduit, ball members movable within the said conduit, lever means cooperating with the said ball members whereby upon predetermined movement of the ball members within the said conduit the lever means are moved outwardly relative to said conduit to actuate the said shiftable portions of said brake means to engage the annular surfaces of the said sleeve member.

17. In a brake mechanism of the character described, the combination including a rotating shaft, means for rotating the said shaft, the said rotating means including a sleeve member having annular surfaces, brake means for engaging the said annular surfaces, the said shaft rotating means including a cam mechanism, conduit means cooperating with the said cam mechanism, ball means within the said conduit means, lever means connected with said conduit means for engaging the said brake means and cooperating with the said ball means, the said latter means being actuated upon rotation of the said shaft rotating means to move the said brake means.

18. In a brake mechanism for a valve or the like having a movable shaft, means for moving the said shaft, the said latter means including a sleeve member having annular surfaces, pivotally mounted brake means for engaging the said annular surfaces, the said shaft moving means including a cam mechanism cooperating therewith, lever means cooperating with the said brake means, combined conduit and ball means therewithin for moving the said brake means upon movement of the said shaft moving means, the actuation of the said cam mechanism effecting the axial movement of a portion of the said lever means relative to the conduit to thereby cause the pivotal movement of the said brake means.

RAYMOND P. SETKA.

REFERENCES CITED

The following references are of record in the file of this patent:

UNITED STATES PATENTS

| Number | Name | Date |
|---|---|---|
| 1,347,006 | Boas | July 20, 1920 |
| 1,565,051 | Bottner | Dec. 8, 1925 |
| 2,351,211 | Hodgson | June 13, 1944 |
| 2,480,212 | Baines | Aug. 30, 1949 |

Certificate of Correction

Patent No. 2,567,035 September 4, 1951

RAYMOND P. SETKA

It is hereby certified that error appears in the printed specification of the above numbered patent requiring correction as follows:

Column 3, line 43, for "where" read *when*; column 7, line 74, for "cable" read *ball*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*